US010432349B2

(12) United States Patent
Wilhelmsson et al.

(10) Patent No.: US 10,432,349 B2
(45) Date of Patent: Oct. 1, 2019

(54) DATA BLOCK TRANSMISSION WITH VARIABLE RETRANSMISSION FEEDBACK TIME

(75) Inventors: Leif Wilhelmsson, Dalby (SE); Johan Rune, Lidingö (SE); Joachim Sachs, Sollentuna (SE); Anders Wallén, Ystad (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 880 days.

(21) Appl. No.: 14/379,827

(22) PCT Filed: Feb. 21, 2012

(86) PCT No.: PCT/EP2012/052947
§ 371 (c)(1),
(2), (4) Date: Aug. 20, 2014

(87) PCT Pub. No.: WO2013/123979
PCT Pub. Date: Aug. 29, 2013

(65) Prior Publication Data
US 2015/0009897 A1 Jan. 8, 2015

(51) Int. Cl.
*H04L 1/00* (2006.01)
*H04L 1/18* (2006.01)

(52) U.S. Cl.
CPC .......... *H04L 1/0007* (2013.01); *H04L 1/1854* (2013.01); *H04L 1/1887* (2013.01)

(58) Field of Classification Search
CPC ... H04L 1/1887; H04L 1/1854; H04L 1/0007; H04L 47/193; H04L 47/30; H04L 69/163;
(Continued)

(56) References Cited

U.S. PATENT DOCUMENTS 7,280,564 B1 * 10/2007 Geile ................. H04L 27/2652
370/507
2004/0165543 A1 * 8/2004 Nakazawa ............ H04L 47/10
370/252
(Continued)

FOREIGN PATENT DOCUMENTS

EP 1052797 A2 11/2000
EP 1225735 A1 7/2002
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 10)", Technical Specification, 3GPP TS 36.331 V10.2.0, Jun. 1, 2011, pp. 1-294, 3GPP, France.

*Primary Examiner* — Anez C Ebrahim
(74) *Attorney, Agent, or Firm* — Coats & Bennett, PLLC

(57) ABSTRACT

Data Block Transmission with Variable Retransmission Feedback Time For communicating data between a transmitter (10) and a receiver (14), wireless transmission of data blocks is implemented on the basis a retransmission protocol with variable value of a feedback time. The feedback time defines a time interval between transmission of one of the data blocks (22) and transmission of a feedback message (23) indicating whether the data block (22) was successfully received. The transmitter (10) or the receiver (14) determines the value of the feedback time. Depending on the determined value of the feedback time, the transmitter (10) controls transmission of the data block (22) to the receiver and/or the receiver (14) controls reception of the data block (22) at the receiver (14). The transmitter (10) may for example be a base station of a mobile network, and the
(Continued)

receiver (14) may be a terminal device connected to the mobile network.

27 Claims, 11 Drawing Sheets

(58) Field of Classification Search
CPC .......... H04L 47/6255; H04W 28/0273; H04W 52/0222; H04W 28/0221; H04W 52/0216
See application file for complete search history.

(56) References Cited

U.S. PATENT DOCUMENTS

| | | |
|---|---|---|
| 2006/0203855 A1* | 9/2006 | Senta .................... H04L 1/1678 370/519 |
| 2007/0133418 A1 | 6/2007 | Agarwal |
| 2010/0008270 A1* | 1/2010 | Ahn ........................ G01S 11/02 370/310 |
| 2010/0153804 A1 | 6/2010 | Cai et al. |

FOREIGN PATENT DOCUMENTS

| | | |
|---|---|---|
| EP | 2352249 A2 | 8/2011 |
| WO | 2006027672 A2 | 3/2006 |

* cited by examiner

DATA BLOCK TRANSMISSION WITH VARIABLE RETRANSMISSION FEEDBACK TIME

TECHNICAL FIELD

The present invention relates to methods for controlling retransmission protocol based transmission of data blocks and to corresponding devices.

BACKGROUND

In mobile networks, such as a 3GPP (Third Generation Partnership Project) mobile network, various types of terminal devices may be used. For example, Machine Type Communication (MTC) terminal devices, such as sensor devices, alarm devices, remote control devices, or the like may be used in addition to conventional types of terminal devices, such as mobile phones, smartphones, data modems, mobile computers, or other types of user equipment (UE). MTC terminal devices are typically characterized by a modest bit rate and sparse communication. MTC terminal devices may therefore be implemented with low-performance communication capabilities.

The existence of MTC terminal devices or other devices having similar data traffic characteristics may have an impact on the mobile network, in particular if the mobile network is designed to support large bandwidths or high throughputs, as for example in a mobile network according to 3GPP LTE (Long Term Evolution).

According to the Release 8/9 versions of the LTE specifications, the supported cell bandwidth is within the range of 6 and 100 resource blocks (RBs), about 1.4 to 20 MHz, and a UE is mandated to support all specified bandwidths in order to be standard compliant. Furthermore, UEs belonging to the lowest defined release 8/9 UE category need to support bit rates of at least 10 Mbit/s in the downlink and 5 Mbit/s in the uplink, which exceeds the needs of most MTC terminal devices. The ability to support high bandwidth, in particular bandwidth flexibility, and high throughput drives both cost and power consumption in the MTC terminal device. Accordingly, it is desirable to define low-performance UE categories in order to meet the characteristics of MTC terminals devices.

With the introduction of low-performance UE categories, it is possible to manufacture terminal devices with considerably less complexity and/or power consumption. In particular, the cost of each device is to a large extent driven by the silicon area. With significantly reduced throughput requirements, it is possible to reduce the size of hardware accelerators that are used to perform the most computationally complex operations, or even to replace them altogether with software implementations. Similarly, in a software-based implementation it is possible to replace large, possibly multiple, processors with smaller and/or fewer ones.

The potential to reduce the power consumption in a terminal device also strongly depends on the supported bitrates. Given a specific UE implementation, operation at the maximum supported bitrate requires a certain number of baseband processing operations, corresponding to a certain power consumption. Lower bitrates than the maximum one require fewer baseband processing operations, whether implemented in hardware or software. Consequently, support of lower bitrates may also be used for enabling reduction of energy consumption by the terminal device.

Even though it is possible to lower device complexity and/or power consumption when the throughput requirements are lower, there are typically still some timing constraints that need to be fulfilled in order to comply with a particular mobile network standard. For example, in 3GPP LTE one such timing constraint is associated with feedback messages of a Hybrid Automatic Repeat Request (HARQ) protocol which is used for reporting whether a transmission on the physical layer was successfully decoded by the UE or not.

More specifically, in 3GPP LTE a synchronous HARQ feedback timing is used. For a downlink transmission this means that when a transmission of a transport block takes place the HARQ feedback message is sent by the UE after a fixed feedback time. Both fixed timing as well as a specific resource allocation, which is based on a mapping to downlink resources used to schedule the transmission of the transport block, provide that no additional information is needed to map the HARQ feedback message to the corresponding terminal and the HARQ process it belongs to.

However, the above fixed HARQ feedback timing may be problematic when different types of terminal devices coexist in the mobile network, e.g., MTC terminal devices and conventional UEs. In particular, low-performance terminal devices may not be able to comply with the HARQ timing requirements in the same way as conventional UEs. Also, the HARQ timing requirements may be problematic for a UE which is in a low power mode.

Similar problems may also exist in other systems using wireless transmission on the basis of a retransmission protocol.

Accordingly, there is a need for techniques which allow for efficiently controlling retransmission-protocol based transmission and reception of data blocks.

SUMMARY

According to an embodiment of the invention, a method of controlling wireless transmission of data blocks between transmitter and a receiver is provided. The wireless transmission of the data blocks is based on a retransmission protocol with variable value of a feedback time. The feedback time defines a time interval between transmission of one of the data blocks and transmission of a feedback message indicating whether the data block was successfully received. According to the method, the transmitter determines the value of the feedback time. Depending on the determined value of the feedback time, the transmitter controls transmission of the data block to the receiver.

According to a further embodiment of the invention, a method of controlling wireless transmission of data blocks between transmitter and a receiver is provided. The wireless transmission of the data blocks is based on a retransmission protocol with variable value of a feedback time. The feedback time defines a time interval between transmission of one of the data blocks and transmission of a feedback message indicating whether the data block was successfully received. According to the method, the receiver determines the value of the feedback time. Depending on the determined value of the feedback time, the receiver controls reception of the data block at the receiver.

According to a further embodiment of the invention, a transmitter is provided. The transmitter comprises a radio interface for wireless transmission of data blocks to a receiver. Further, the transmitter comprises a processor. The processor is configured to control transmission of the data blocks on the basis of a retransmission protocol with variable value of a feedback time. The feedback time defines a time interval between transmission of one of the data blocks and transmission of a feedback message indicating whether the data block was successfully received. Further, the processor is configured to determine the value of the feedback time and, on the basis of the determined value of the feedback time, control the transmission of the data block to the receiver.

According to a further embodiment of the invention, a receiver is provided. The receiver comprises a radio interface for wireless reception of data blocks from a transmitter. Further, the receiver comprises a processor. The processor is configured to control reception of the data blocks on the basis of a retransmission protocol with variable value of a feedback time. The feedback time defines a time interval between transmission of one of the data blocks and transmission of a feedback message indicating whether the data block was successfully received. Further, the processor is configured to determine the value of the feedback time and, on the basis of the determined value of the feedback time, control the reception of the data block at the receiver.

According to a further embodiment of the invention, a computer program product is provided, e.g., in the form of a physical storage medium. The computer program product comprises program code to be executed by a processor of a transmitter. By executing the program code, the transmitter is configured to control transmission of the data blocks on the basis of a retransmission protocol with variable value of a feedback time. The feedback time defines a time interval between transmission of one of the data blocks and transmission of a feedback message indicating whether the data block was successfully received. By executing the program code, the transmitter is further configured to determine the value of the feedback time and, on the basis of the determined value of the feedback time, control the transmission of the data block to the receiver.

According to a further embodiment of the invention, a computer program product is provided, e.g., in the form of a physical storage medium. The computer program product comprises program code to be executed by a processor of a receiver. By executing the program code, the receiver is configured to control reception of the data blocks on the basis of a retransmission protocol with variable value of a feedback time. The feedback time defines a time interval between transmission of one of the data blocks and transmission of a feedback message indicating whether the data block was successfully received. By executing the program code, the receiver is further configured to determine the value of the feedback time and, on the basis of the determined value of the feedback time, control the reception of the data block at the receiver.

DETAILED DESCRIPTION OF EMBODIMENTS

In the following, the invention will be explained in more detail by referring to exemplary embodiments and to the accompanying drawings. The illustrated embodiments relate to concepts involving retransmission-protocol based wireless transmission of data blocks between a transmitter and a receiver. The retransmission-protocol based wireless transmission includes sending of the data blocks from the transmitter and reception of the data blocks at the receiver. Further, it typically also includes sending feedback messages from the receiver to the transmitter and, if needed, performing retransmissions of data blocks from the transmitter to the receiver. In some scenarios, the transmitter may be a base station of a mobile network, and the receiver may be a terminal device, e.g., a UE. In other scenarios, the transmitter and the receiver may correspond to other types of wireless communication devices, e.g., to devices equipped with a Wireless Local Area Network (WLAN) interface operating in an ad-hoc mode.

Figure 1:
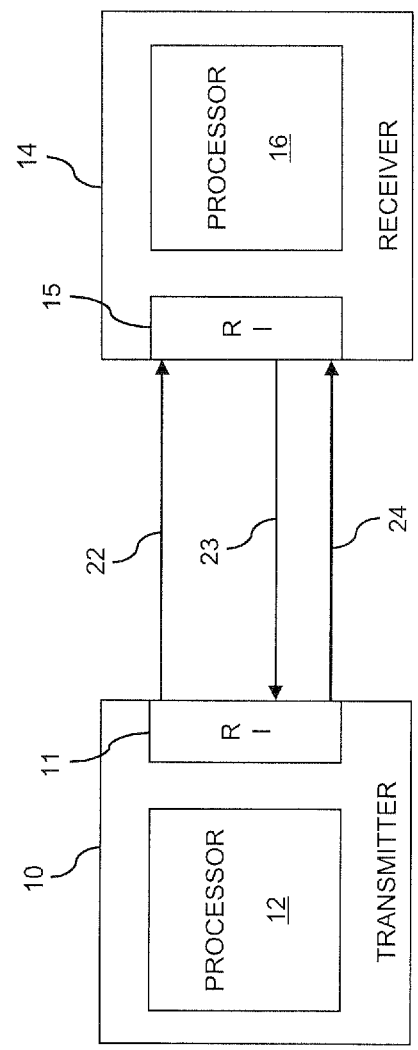
FIG. 1 schematically illustrates a transmitter and a receiver according to an embodiment of the invention.

FIG. 1 schematically illustrates an example of a system in which retransmission-protocol based wireless transmission may be implemented according to an embodiment of the invention. The system includes a transmitter 10 and a receiver 14. The transmitter 10 and the receiver 14 are configured to perform transmission of data blocks on the basis of a retransmission protocol. The retransmission protocol may be an Automatic Repeat reQuest (ARQ) protocol or a Hybrid Automatic Repeat reQuest (HARQ) protocol.

For sending signals for transmission of a data block 22, the transmitter 10 is provided with a radio interface (RI) 11. For controlling transmission procedures of the retransmission protocol, which are performed by the transmitter 10 for sending the data block 22, the transmitter 10 is provided with a processor 12. The receiver 14 is in turn provided with a radio interface (RI) 15 for receiving the signals for transmission of the data block 22, and with a processor 16 for controlling reception procedures of the retransmission protocol, which are performed by the receiver 14 for receiving the data block 22. The procedures of the retransmission protocol performed by the transmitter 10 may in particular include performing an initial transmission of the data block 22, receiving a feedback message 23 indicating whether the data block 22 was successfully received, and selectively performing a retransmission 24 of the data block 22. The feedback message 23 may be an ACK ("acknowledgement") indicating that the data block 22 was successfully received, or a NACK ("negative acknowledgement") indicating that the data block 22 was not successfully received. The retransmission 24 may be performed if the feedback message 23 indicates that the data block was not successfully received, i.e., if the feedback message is a NACK. Further, the retransmission 24 may be performed if, after expiry of a timer, the transmitter 10 has not received the feedback message 23. The retransmission protocol may operate on the physical layer, and successful reception may be defined as successful physical layer decoding. The procedures of the retransmission protocol performed by the receiver 14 may in particular include receiving the initial transmission of the data block 22, verifying whether the data block 22 was successfully received, sending the feedback message 23, and, if the data block 22 was not successfully received, reception of the retransmission 24. The procedures of transmitting the feedback message 23 and performing the retransmission 24 may be repeated until the data block 22 is successfully received or a maximum number of retransmissions 24 is reached.

According to concepts as described herein, the retransmission protocol may use a variable value of a feedback time. That is to say, at least two different values of the feedback time may be supported. The feedback time defines a time interval between transmission of the data block 22 and transmission of the feedback message 23. In this way, individual processing capabilities, e.g., for decoding signals for transmission of the data block 22, may be taken into account when controlling the transmission procedures performed by the transmitter 10 and/or the receiver 14. The value of the feedback time may be determined by the transmitter 10, e.g., by the processor 12, and/or by the receiver 14, e.g., by the processor 16. In some scenarios, the transmitter 10 and the receiver 14 may negotiate the value of the feedback time. The value of the feedback time may be determined depending on the size of the data block. Alternatively, the size of the data block 22 may be controlled depending on the determined value of the feedback time. In the latter case, the size of the data block may further be controlled depending on radio channel conditions of one or more radio channels used for the wireless transmission of the data block 22 from the transmitter 10 to the receiver 14.

In the following further details of the concepts will be explained by referring to an exemplary implementation in a mobile network, in which the transmitter 10 is implemented by a base station of the mobile network, and the receiver 14 is implemented by a UE or terminal device connected to the mobile network.

Figure 2:
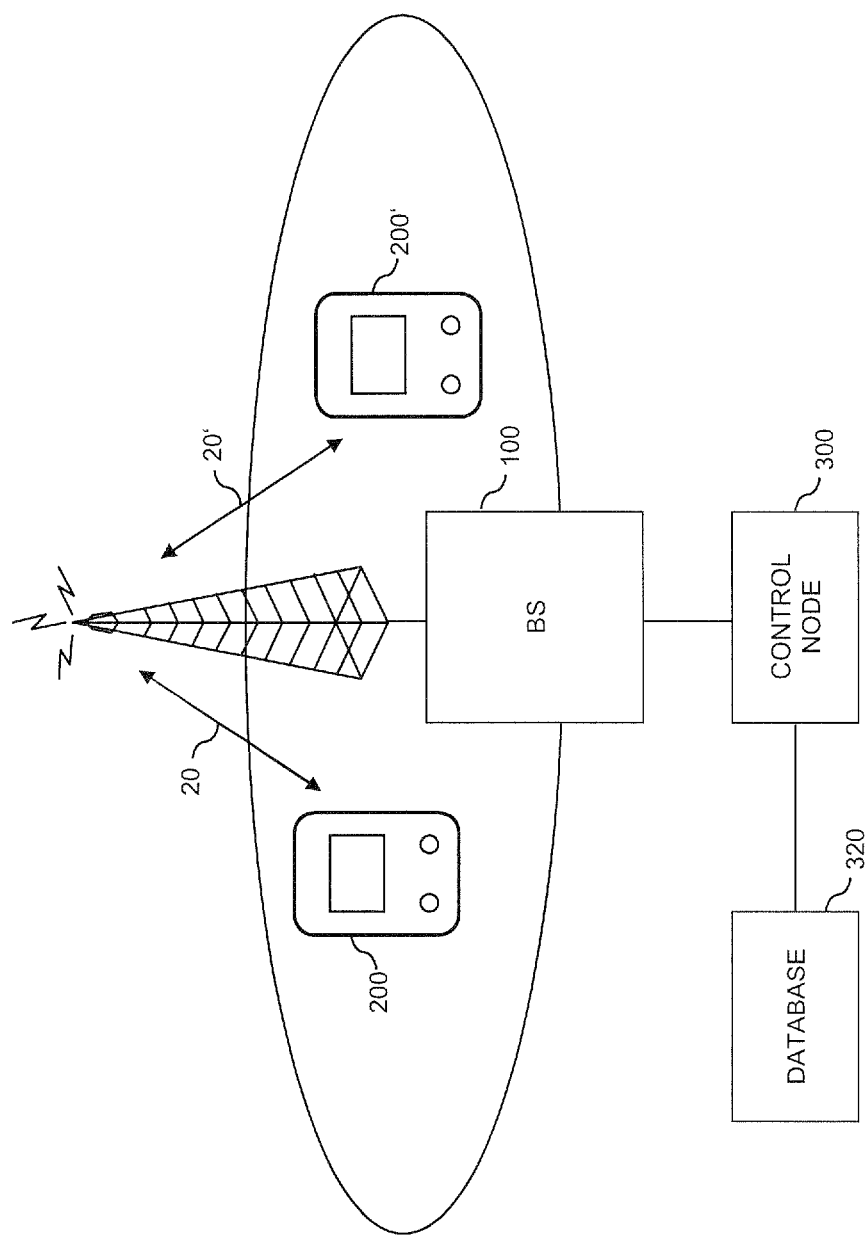
FIG. 2 schematically illustrates a mobile network environment in which concepts according to embodiments of the invention can be applied.

FIG. 2 schematically illustrates corresponding mobile network environment, i.e., infrastructure of the mobile network, represented by a base station (BS) 100, a control node 300 and a database 320, as well as a first terminal device 200 and a second terminal device 200' which may connect to the mobile network for transmission of data, e.g., for reception of data from the BS 100 and/or for sending of data to the BS 100, as illustrated by arrows 20, 20'. The transmission of data is assumed to occur in the form of data blocks, in the following also referred to as transport blocks, having a certain size. In some scenarios, different sizes of data blocks can be supported by the mobile network, which means that the data block size can vary from one data block to the other or between different terminal devices. For downlink transmission of data blocks from the mobile network to the terminal devices 200, 200', the BS 100 may correspond to the transmitter 10 of FIG. 1, and each of the terminal devices 200, 200' may correspond to the receiver 14 of FIG. 1.

In the following, it will be assumed that the mobile network is implemented according to 3GPP LTE. Accordingly, the BS 100 may be an evolved Node B or Evolved Universal Terrestrial Radio Access Network (E-UTRAN) Node B (eNB), and the control node 300 may be a Mobility Management Entity (MME). The database 320 may for example be implemented by a Home Subscriber Server (HSS).

In the illustrated example, it is assumed that the second terminal device 200' has lower processing capabilities than the first terminal device 200. For example, the first terminal device 200 may be a mobile phone, portable computer, or other type of UE whereas the second terminal device 200' is a MTC terminal device, a low-cost UE, or a UE operated in a low-power mode. For example, the second terminal device 200' may have a smaller buffer for soft decoding or a lower processing performance than the first terminal device 200. Also, the second terminal device 200' may have other retransmission protocol capabilities than the first terminal device 200. For example, the first terminal device 200 and the second terminal device 200' may use a HARQ protocol for transmission of the data blocks to or from the base station, and the number of retransmissions allowed for the second terminal device 200' may be lower than for the first terminal device 200. Further, the number of HARQ processes which are allowed in parallel could be lower for the second terminal device 200' than for the first terminal device 200. For example, the second terminal device 200' could allow only one HARQ process.

The different processing capabilities may in particular result in different processing times required by the terminal devices 200, 200' for processing signals for transmission of one of the data blocks, e.g., for decoding signals for transmission of a data block from the mobile network to the terminal device 200, 200' or for encoding signals for transmission of a data block from the terminal device 200, 200' to the mobile network.

In the mobile network scenario of FIG. 2, the concepts explained in connection with FIG. 1 may be used for efficiently dealing with different processing capabilities of the first and second terminal devices 200, 200'. In particular, the first and second terminal devices 200, 200' may use different values of the feedback time. Accordingly, terminal devices having different processing capabilities may connect to the mobile network and comply with the timing requirements of the HARQ protocol, and the mobile network may take into account these different processing capabilities when transmitting data blocks to the terminal devices. Also, by allowing the same terminal device 200, 200' to use different values of the feedback time, also variations of the processing capabilities of the same terminal device may be taken into account, e.g., variations due to switching of the terminal device into a low-power mode. Further, also variations in the processing demand of the terminal device may be taken into account, e.g., due to Quality of Service (QoS) requirements of a certain service which is temporarily used by the terminal device or due to processing demand of an application executed by the terminal device.

In the mobile network scenario of FIG. 2, various procedures can be used by the BS 100 for determining the value of the feedback time. For example, the BS 100 may obtain the value of the feedback time from another node or from the terminal device 200, 200' itself. In the mobile network environment of FIG. 1, the BS 100 could obtain the value of the feedback time of the first terminal device 200 and/or of the second terminal device 200' from the control node 300. In the illustrated LTE scenario, this would mean that the eNB obtains the value of the feedback time from the MME. The BS 100 could also obtain the value of the feedback time from a database, e.g., the database 320. Moreover, the BS 100 could obtain the value of the feedback time from a node of a core network of the mobile network, e.g., when the terminal device 200, 200' attaches to the mobile network.

For obtaining the value of the feedback time, the BS 100 may receive control data from the other node of the mobile network or from the terminal device 200, 200' itself. The control data may explicitly indicate the value of the feedback time or may include data which allow for determining the value of the feedback time. The BS 100 may also determine the value of the feedback time from data indicating a device category of the terminal device 200, 200', e.g., as a value assigned to the device category. The device category could for example indicate that the second terminal device 200' is a low-performance terminal device. The data indicating the device category may in turn be received from another node of the mobile network or from the terminal device 200, 200' itself. Also, the BS 100 could determine the value of the feedback time from other data available at the BS 100, e.g., from UE capability information signaled to the BS 100. The BS 100 could also receive data related to the terminal device 200, 200' from the database 320 and determine the value of the feedback time from this data. The BS 100 may also initiate a measurement of the feedback time to determine its value, e.g., by evaluating the terminal device's 200, 200' feedback response to a received data block. Moreover, the BS 100 could set the value of the feedback time and send control data indicating the set value to the terminal device 200, 200'. Such control data may in turn cause the terminal device 200, 200' to adjust its operation to match the indicated value of the feedback time, e.g., by entering or leaving a low-power mode if available or setting the timing for sending the feedback message. The value of the feedback time may also be determined on the basis of the size of the data blocks to be transmitted. Alternatively, the size of the data block to be transmitted may be controlled depending on the determined value of the feedback time, e.g., by defining a corresponding maximum data block size.

In some scenarios, the value of feedback time may also be determined by the terminal device 200, 200' and then indicated to the BS 100. The terminal device 200, 200' could also determine the value of the feedback time, determine a maximum data block size corresponding to this value, and then indicate the determined maximum data block size to the BS 100. The BS 100 could then control the sizes of data blocks to be transmitted to the terminal device 200, 200' based on the maximum data block size as indicated by the terminal device 200, 200', e.g., by controlling the size of the data blocks to not exceed the indicated maximum data block size.

Figure 3:
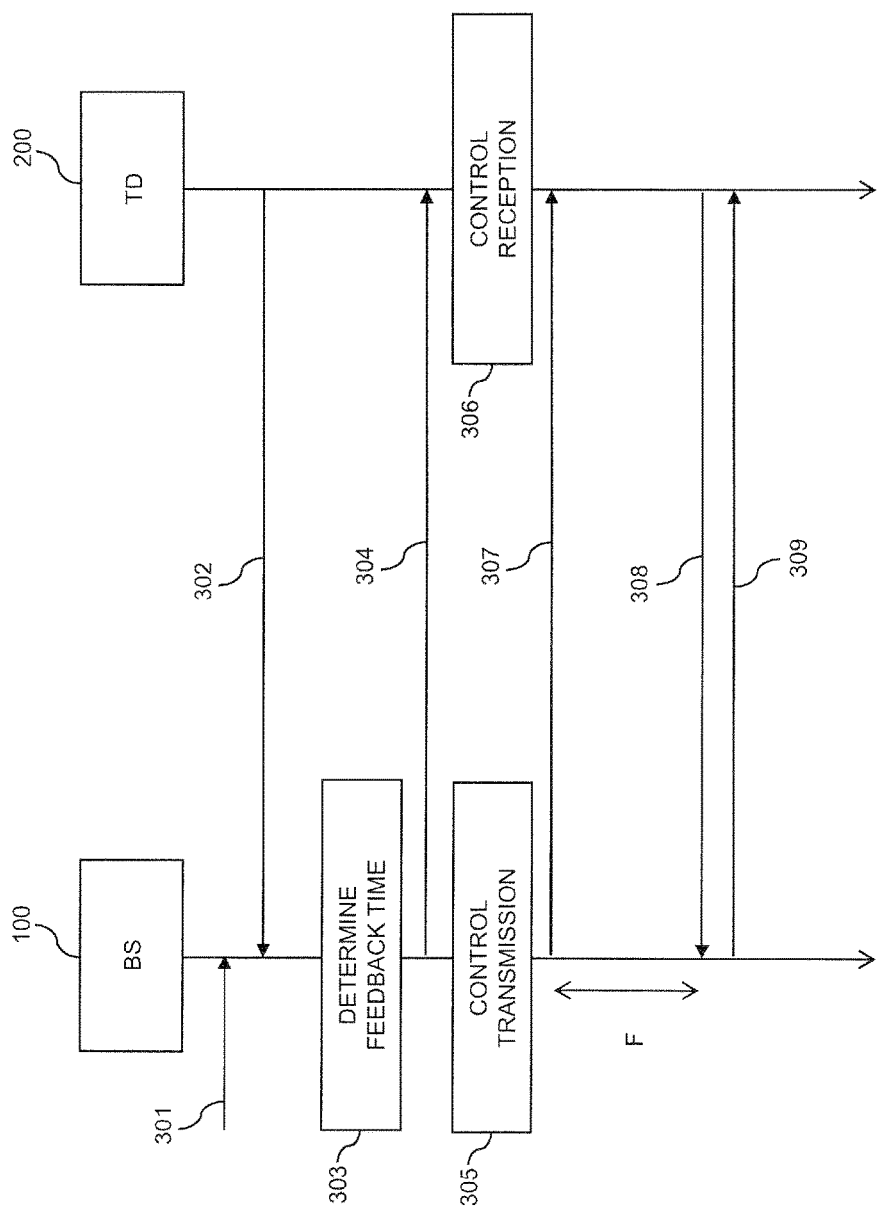
FIG. 3 shows a signaling diagram for schematically illustrating exemplary procedures according to an embodiment of the invention.

In the following, the concepts will be explained in more detail by referring to an exemplary implementation for downlink transmission of a data block when assuming the above-mentioned LTE scenario. FIG. 3 shows a signaling diagram for illustrating exemplary procedures of such implementation. The procedures of FIG. 3 involve the BS 100 and the terminal device (TD) 200 or 200'.

Initially, the BS 100 may receive control data, e.g., by message 301 from a further node of the mobile network and/or by message 302 from the terminal device 200/200'. The further node of the mobile network may be the database 320, e.g., a subscription database or a device database implemented by the HSS. The database may for example provide the base station 100 with data associated with a device identifier, e.g., an International Mobile Equipment Identity (IMEI), wherein the base station 100 may retrieve the IMEI from the terminal device 200/200' in order to be able to request the data associated with the IMEI from the database 320. In some scenarios, the message 301 may also be received from a control node, e.g., the MME or control node 300. In such scenarios the control node may in turn receive the content of the message, i.e., control data such as device capability, feedback time requirements or other device capabilities, from a database, e.g., the database 320, wherein this database, as described above, may be device database or a subscription database, e.g., the HSS. The control node may also receive the required control data, such as device category or feedback time requirements or other capabilities, from the terminal device 200/200'. The control node may also receive the IMEI from the terminal device 200/200' and use the IMEI to match it with the required control data. The further node may for example be a node of the core network which is capable of providing device-specific information, e.g., on the basis of the IMEI. For example, a device category could be provided on the basis of the IMEI. The device-specific data, with or without the IMEI or other device identifier, may in some scenarios be part of subscription data.

At step 303, the BS 100 determines the value of the feedback time F. This may be accomplished on the basis of the control data received in message 301 and/or in message 302. For example, the BS 100 may set the value of the feedback time F to a known value, e.g., on the basis of data configured in the BS 100. Further, the value of the feedback time F may be a parameter associated with the subscriber of the terminal device 200/200', e.g., as identified by an International Mobile Subscriber Identity (IMSI), which may be stored in a subscription database in the network as well as in a Subscriber Identity Module (SIM) or Universal Subscriber Identity Module (USIM) in the terminal device 200/200', or with the terminal device 200/200' itself, e.g., as identified by the IMEI or other device identifier, and be stored in a subscription database or device database, e.g., in the HSS. The value of the feedback time F may then be provided to the core network and/or RAN during attachment of the terminal device 200/200' to the mobile network.

Further, the BS 100 may determine the value of the feedback time F in relation to a certain parameter, such as a protocol timer, e.g., a Radio Link Control (RLC) protocol timer.

The value of the feedback time F may also be a value assigned to a device category of the terminal device 200/200'. The device category may in turn be signalled to the BS 100 using message 301 or using message 302, i.e., from the further node of the mobile network or from the terminal device 200/200'.

The message 301 and/or the message 302 may explicitly indicate the value of the feedback time F. For example, the message 302 may be a Radio Resource Control (RRC) protocol message. In this case, the value of the feedback time F may be explicitly indicated as UE capability information, using the "UECapabilityInformation" RRC message. Alternatively, the message 302 could be a control element of a Medium Access Control (MAC) protocol used between the terminal device 200/200' and the BS 100, also referred to as MAC Control Element.

In some scenarios, the terminal device 200/200' may determine the value of the feedback time F to be indicated to the BS 100 using message 302. For example, the terminal device 200/200' may determine the value of the feedback time F using a measurement, e.g., by measuring the time needed to decode signals for transmission of a transport block. Such measurement procedures can be initiated by the terminal device 200/200' or by the BS 100.

In some scenarios, the BS 100 may determine the value of the feedback time F using a measurement, e.g., by evaluating responses to transmissions of transport blocks received from the terminal device 200/200'. Examples of such responses are HARQ feedback messages or feedback messages of the RLC protocol. For example, the BS 100 may measure the time interval between sending a transport block to the terminal device 200/200' and receiving the corresponding response from the terminal device 200/200'.

In some scenarios, a default value of the feedback time F may be included in subscription data or device data and be provided to the BS 100 using message 301, and it may be possible to override this default value by a new value provided by the terminal device using message 302.

The value of the feedback time F as provided from the terminal device 200, 200' to the BS 100 may be adapted to changing conditions, e.g., a battery status of the terminal device 200/200'. For example, if the battery level decreases below a certain threshold, the terminal device 200/200' could indicate a larger value of the feedback time F to the BS 100. In some scenarios, e.g., if the terminal device 200/200' uses energy harvesting methods, such as solar power or piezo-electric energy harvesting, the value of the feedback time F indicated by the terminal device 200/200' to the BS 100 may depend on an estimated amount of energy this energy harvesting can provide in a given period of time. For example, a solar powered terminal device 200/200' would be able to store energy at a lower rate when the sky is overcast, and a piezo-electric energy harvester embedded in a roadbed would accumulate more energy during rush hour when the traffic is heavy. Thus, during times of high productivity of energy harvesting, the terminal device 200/200' may indicate a smaller value of the feedback time F, e.g., corresponding to operation in a normal mode, whereas the terminal device 200/200' could indicate a larger value of the feedback time F, e.g., corresponding to operation in a low power mode, when energy harvesting is less productive.

In some scenarios, processing resources of the terminal device 200/200' may be shared by processing for transport block reception and other tasks, e.g., execution of one or more software application. In this case, the value of the feedback time may in addition or alternatively be determined depending on how much of the total processing resources are available for the processing of transport block reception. The terminal device 200/200' may then determine the value of the feedback time accordingly and indicate the value to the BS 100, e.g., using message 302.

The determination of the value of the feedback time F at step 303 may involve a selection between multiple predefined values of the feedback time F, e.g., a smallest value of 4 ms to facilitate compatibility with existing LTE device, and a number of larger values, e.g., multiples of 4 ms.

By message 304, the BS 100 may send control data indicating the value of the feedback time determined at step 303 to the terminal device 200/200'. In some cases, this may confirm a value of the feedback time F which was provided by the terminal device 200/200' in message 302. In other cases, this may cause the terminal device 200/200' to adjust its operation accordingly, e.g., by entering or leaving a low-power mode. The message 304 may for example be a message of the RRC protocol or a MAC Control Element. The message 304 may also be a downlink scheduling assignment for allocation downlink transmission resources, wherein the message 304 may be sent on a downlink signalling channel, such as the Physical Downlink Control Channel (PDCCH) in LTE.

At step 305, the BS 100 controls, depending on the value of the feedback time F, transmission of a transport block to the terminal device 200/200'. This control may involve determining a size of the transport block depending on the value of the feedback time F. Further, this control may involve scheduling an initial transmission 307 of the transport block, i.e., determining scheduling information, in particular time resources and frequency resources, for the initial transmission 307 of the transport block. Further, this control may involve controlling the BS 100 to receive a feedback message 308 indicating whether the transport block was successfully received, e.g., a HARQ ACK or HARQ NACK. For this purpose, the BS 100 may start monitoring a control channel used for transmission of the feedback message 308 after a time interval corresponding to the value of the feedback time F and starting at the initial transmission 307 of the transport block. Further, the BS 100 may prohibit any retransmission of the transport block before expiry of this time interval.

The determination of the size of the transport block may in addition be accomplished depending on one or more applications executed by the terminal device 200/200'. For example, when executing an application where the data is not time-critical, e.g., file download, large transport block sizes may be desirable, whereas in case of time-critical applications, e.g., streaming of audio and/or video data, smaller transport block sizes may be desirable. In the BS 100 such application awareness, could achieved by basing the determination of the size of the transport block on the QoS associated with a bearer used for transmission of the transport block. The QoS may be signaled from the control node 300, i.e., from the MME, through a S1AP message, e.g., a E-RAB SETUP REQUEST message, a E-RAB MODIFY REQUEST message, or a UE CONTEXT MODIFICATION message. Further, an application identifier could be signaled from the terminal device 200/200' to the BS 100, e.g., by using a corresponding MAC Control Element, a corresponding RRC message, or a corresponding Information Element (IE) in an existing RRC message.

At step 306, the terminal device 200/200' controls, depending on the value of the feedback time F, reception of the transport block at the terminal device 200/200'. This control may involve receiving scheduling information for the initial transmission 307 from the BS 100 and controlling the terminal device 200/200' to monitor a data channel used for transmission of the transport blocks according to the scheduling information. Further, this control may involve controlling the terminal device 200/200' to send the feedback message 308 to the BS 100. Also, if the feedback message 308 is a NACK, this control may involve controlling the terminal device 200/200' to monitor a control channel for receiving scheduling information of the retransmission 309. In particular, the terminal device 200/200' may be controlled to monitor the control channel when a time interval ends which corresponds to the value of the feedback time F and starts at reception of the scheduling information for the initial transmission 307 of the transport block, wherein the retransmission 309 may be scheduled at any time after this point in time. As an alternative the point in time at which a retransmission 309 is scheduled, in case the feedback message 308 is a NACK, may be fixed in advance, e.g., to occur a time interval corresponding to the value of the feedback time F after the initial transmission 307. Moreover, for a large value of the feedback time F, the terminal device 200/200' may adjust its operation to slow, energy efficient decoding, e.g., by reducing the clock frequency and/or operating voltage of a processor used to perform the decoding. For a small value of the feedback time F, a higher decoding performance may be selected, e.g., by operating the processor used for the decoding at its nominal clock frequency and/or operating voltage.

In accordance with the control of step 305, the BS 100 performs the initial transmission 307 of the transport block to the terminal device 200/200', receives the feedback message 308, and if the feedback message 308 is a NACK, performs a retransmission 309 of the transport block. After expiry of the time interval time corresponding to the value of the feedback time F and starting at the initial transmission 307 of the transport block, the BS 100 may also perform the retransmission 309 if for some reason the feedback message 308 was not received by the BS 100 and a timer has expired. Similarly, the terminal device 200/200' receives the initial transmission 307 of the transport block, sends the feedback message 308, and, if the transport block was not successfully received with the initial transmission 307, receives the retransmission 309 of the transport block.

In some scenarios, the value of the feedback time F determined at step 303 may additionally or alternatively depend on the size of transport blocks to be transmitted. For this purpose, the value of the processing time F may be determined individually for different transport blocks, e.g., when transmission of the transport block is scheduled. The dependency of the value of the feedback time F on the size of the transport block can be defined by using an algebraic expression and/or a lookup table, which may for example be configured at the BS 100. For example, the value of the feedback time F could be configured to be proportional to the size of the transport block, typically with a suitable granularity of allowed values of the feedback time F. Further, if two different values of the feedback time F are supported, the smaller value of the feedback time F could be selected if the size of the transport block is smaller than a given threshold, and the larger value of the feedback time F could be selected if the size of the transport block is larger than this threshold. By defining additional threshold values, this can also be extended to more than two values of the feedback time F.

If the value of the feedback time is determined on the basis of a device category, the device category may also be associated with two or more values of the feedback delay which are in turn associated with corresponding transport block sizes. In this way, the dependency of the feedback time on the size of the transport block may be adapted to the device category. Similarly, a UE capability could be associated with two or more values of the feedback delay which are in turn associated with corresponding transport block sizes. When a UE capability is signaled to the BS 100, this may implicitly indicate the values of the feedback time or transport block sizes. For example, the terminal device 200/200' may signal that it has a specific enumerated capability, where the enumeration is associated with one or more values of the feedback delay and optionally also associated values of the transport block size.

In some scenarios, the BS 100 may indicate the value of the feedback time F together with the scheduling information for the initial transmission 307 of the transport block, rather than using the message 304. The terminal device 200/200' may then adapt its operation accordingly, e.g., by suitable control in step 306. This may be specifically efficient if the BS 100 determines the value of the feedback delay individually for each transport block, e.g., depending on the size of the transport block.

Figure 4:
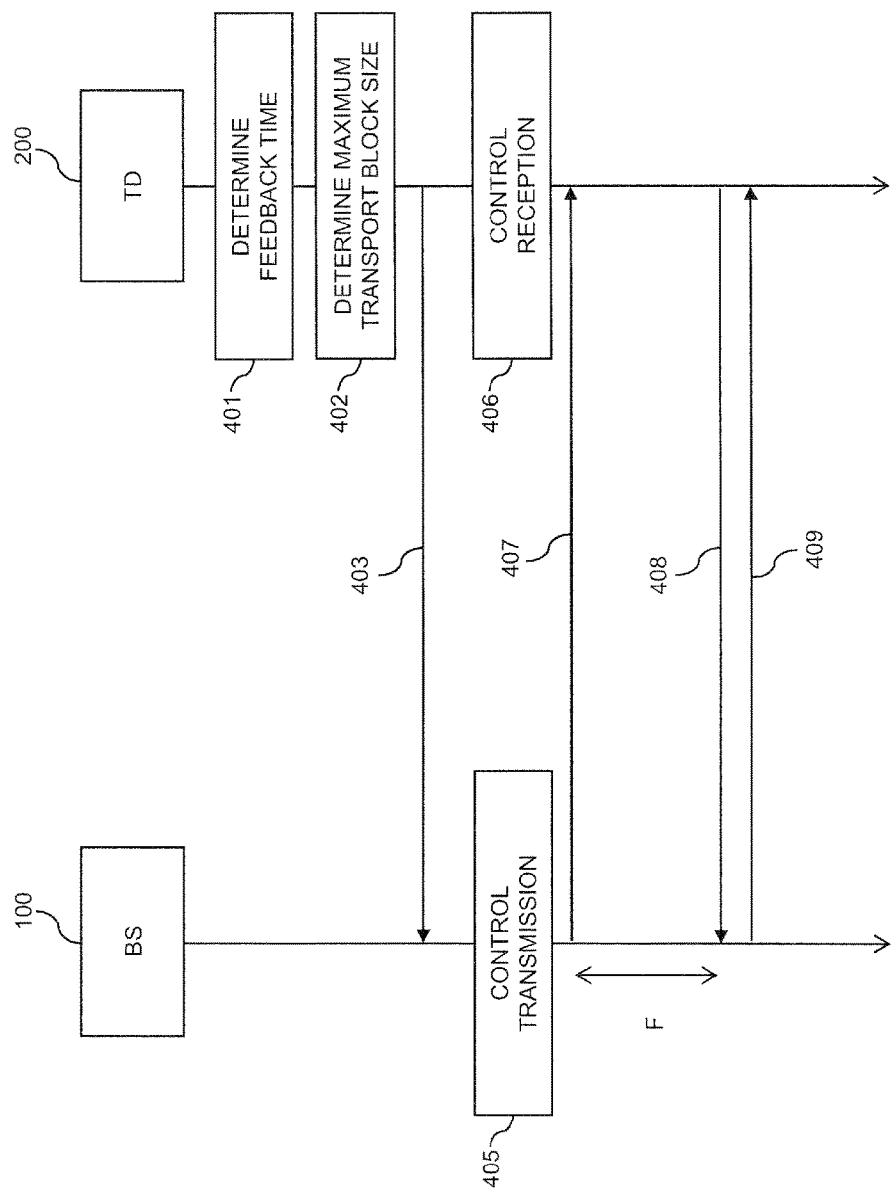
FIG. 4 shows a signaling diagram for schematically illustrating further exemplary procedures according to an embodiment of the invention.

FIG. 4 shows a signaling diagram for illustrating exemplary procedures of an implementation in which determination of the value of the feedback time F is accomplished at the terminal device. In this case, a high degree of freedom for the terminal device concerning implementation of power saving or performance control can be provided. The procedures of FIG. 4 involve the BS 100 and the terminal device (TD) 200 or 200'.

At step 401, the terminal device 200/200' determines the value of the feedback time F. This may be accomplished on the basis of the control data received from the BS 100 and/or on the basis of data configured in the terminal device 200/200'. For example, such control data provided by the BS 100 could define a minimum limit and/or a maximum limit for the value of the feedback time. The BS 100 could signal the control data using a MAC Control Element or a RRC message. Further, the control data could be signaled together with scheduling information or using broadcast system information.

In some scenarios, processing resources of the terminal device 200/200' may be shared by processing for transport block reception and other tasks, e.g., execution of one or more software application. In this case, the value of the feedback time may in addition or alternatively be determined depending on how much of the total processing resources are available for the processing needed for transport block reception. The terminal device 200/200' may then determine the value of the feedback time F accordingly.

Further, the determination of the value of the feedback time F may be accomplished on the basis of other operating characteristics of the terminal device 200/200', e.g., depending on whether the terminal device 200/200' operates in a low power mode. Also, the terminal device 200/200' may determine the value of the feedback time F in relation to a parameter such as a protocol timer, e.g., a RLC protocol timer. Further, the terminal device 200/200' may determine the value of the feedback time F using a measurement, e.g., by measuring the time needed to decode signals for transmission of a transport block. Such measurement procedures can be initiated by the terminal device 200/200' or by the BS 100.

The value of the feedback time F as determined by the terminal device 200/200' may be adapted to changing conditions, e.g., a battery status of the terminal device 200/200'. For example, if the remaining battery capacity decreases below a certain threshold, the terminal device 200/200' could determine a larger value of the feedback time F. In some scenarios, e.g., if the terminal device 200/200' uses energy harvesting methods, such as solar power or piezoelectric energy harvesting, the value of the feedback time F determined by the terminal device 200/200' may depend on an estimated amount of energy this energy harvesting can provide in a given period of time. For example, a solar powered terminal device 200/200' would be able to store energy at a lower rate when the sky is overcast, and a piezo-electric energy harvester embedded in a roadbed would accumulate more energy during rush hour when the traffic is heavy. Thus, during times of high productivity of energy harvesting, the terminal device 200/200' may determine a smaller value of the feedback time F, e.g., corresponding to operation in a normal mode, whereas the terminal device 200/200' could indicate a larger value of the feedback time F, e.g., corresponding to operation in a low power mode, when energy harvesting is less productive.

The determination of the value of the feedback time F at step 401 may involve a selection between multiple predefined values of the feedback time F, e.g., a smallest value of 4 ms to facilitate compatibility with existing LTE devices, and a number of larger values, e.g., multiples of 4 ms.

At step 402, the terminal device 200/200' determines a maximum transport block size. This is accomplished depending on the value of the feedback time F as determined at step 401. The dependency of the maximum transport block size on the value of the feedback time F can be defined by using an algebraic expression and/or a lookup table, which may for example be configured at the terminal device 200/200'. For example, such a lookup table could define a corresponding maximum transport block size for each supported value of the feedback time F. The maximum transport block size may also be determined based on measurements of the decoding time for transport blocks of various sizes.

In addition, the determination of the maximum transport block size may also be accomplished depending on one or more applications executed by the terminal device 200/200'. For example, when executing an application where the data is not time-critical, e.g., file download, large transport block sizes may be desirable, whereas in case of time-critical applications, e.g., streaming of audio and/or video data, smaller transport block sizes may be desirable. Such transport block sizes can be achieved by suitably determining the maximum transport block size.

By message 403, the terminal device 200/200' indicates the determined maximum transport block size to the BS 100. Further, the message 403 may indicate the determined value of the feedback time F to the BS 100, either instead of the transport block size or together with the transport block size. The message 403 may for example be a message of the RRC protocol or a MAC Control Element. The message 403 may explicitly indicate the maximum transport block size and, if provided, the value of the feedback time F. For example, the message 403 may be a RRC protocol message. In this case, the value of the feedback time F may be explicitly indicated as UE capability information, using the "UECapabilityInformation" RRC message. Alternatively, the message 403 could be a MAC Control Element.

At step 405, the BS 100 controls transmission of a transport block to the terminal device 200/200'. This is accomplished on the basis of the maximum transport block size indicated by the terminal device 200/200'. Further, if also the value of the feedback time F is indicated to the BS 100, this control may further be based on the value of the feedback time F. More specifically, the control of step 405 may involve determining a size of the transport block so as to not exceed the maximum transport block size. Further, the control of step 405 may involve scheduling an initial transmission 407 of the transport block, i.e., determining scheduling information, in particular time resources and frequency resources, for the initial transmission 407 of the transport block. Further, this control may involve controlling the BS 100 to receive a feedback message 408 indicating whether the transport block was successfully received, e.g., an ACK or NACK. For this purpose, the BS 100 may start monitoring a control channel used for transmission of the feedback message 408 after a time interval corresponding to the value of the feedback time F and starting at the initial transmission 407 of the transport block. Further, the BS 100 may prohibit any retransmission of the transport block 407 before expiry of this time interval. The BS 100 may also control the transmission of a transport block at step 405 based only on the feedback time F, which may have been received from the terminal device 200/200', without taking a maximum transport block size into account, e.g., in the case the maximum transport block size was not signaled from the terminal device 200/200'.

At step 406, the terminal device 200/200' controls, depending on the value of the feedback time F, reception of the transport block at the terminal device 200/200'. This control may involve receiving scheduling information for the initial transmission 407 of the transport block from the BS 100 and, according to the scheduling information, controlling the terminal device 200/200' to monitor a data channel used for transmission of the transport blocks. Further, this control may involve controlling the terminal device 200/200' to send the feedback message 408 to the BS 100. Also, if the feedback message 408 is a NACK, this control may involve controlling the terminal device 200/200' to monitor a control channel for receiving scheduling information of the retransmission 409. In particular, the terminal device 200/200' may be controlled to monitor the control channel when a time interval ends which corresponds to the value of the feedback time F and starts at reception of the scheduling information for the initial transmission 407 of the transport block.

In accordance with the control of step 405, the BS 100 performs the initial transmission 407 of the transport block to the terminal device 200/200', receives the feedback message 408, and if the feedback message 408 is a HARQ NACK, performs a retransmission 409 of the transport block. After expiry of the time interval time corresponding to the value of the feedback time F and starting at the initial transmission 407 of the transport block, the BS 100 may also perform the retransmission 409 if for some reason the feedback message 408 was not received by the BS 100 and a timer has expired. Similarly, the terminal device 200/200' receives the initial transmission 407 of the transport block, sends the feedback message 408, and, if the transport block was not successfully received with the initial transmission 407, receives the retransmission 409 of the transport block.

If the same value of the feedback time is used independent of the size of individual transport block, but the maximum transport block size is determined, e.g., as in the procedures of FIG. 4, the timing requirements of the retransmission protocol can be met in an efficient manner. For example, by indicating a small maximum transport block size the terminal device 200/200' can reduce the power consumption by lowering its clock speed or by means of voltage scaling, i.e., by reducing one or more internal operating voltages.

The maximum transport block size may be negotiated by the terminal device 200/200' and the BS 100 using suitable mechanisms. For example, such negotiation could be implemented by a simple indication provided from the terminal device 200/200' to the BS 100, e.g., as with message 403 of FIG. 4. This indication could also be implicitly or explicitly acknowledged by the BS 100. This could for example be implemented as part of a RRC connection setup procedure, e.g., with a maximum transport block size request or indication in a RRCConnectionRequest message from the terminal 200/200' and with an acknowledgement in a RRCConnectionSetup message from the BS 100. Alternatively, the terminal device 200/200' may include a maximum transport block size indication in a RRCConnectionSetupComplete message without explicit acknowledgement from the BS 100. In the latter case the terminal device 200/200' may interpret the continuation of the RRC connection setup procedure by the BS 100 as an implicit acknowledgement of the indicated maximum transport block size. The BS 100 may also include an acknowledgement of the indicated maximum transport block size in a RRCConnectionReconfiguration message. To enable the terminal device 200/200' to indicate later changes of the maximum transport block size, e.g., due to a low battery level, the terminal device 200/200' could be allowed to send an unsolicited UECapabilityInformation message to the BS 100, i.e., a UECapabilityInformation message without a corresponding request from the BS 100. The UECapabilityInformation message could include a new Information Element (IE) for the maximum transport block size. Further, a corresponding RRC message or MAC Control Element could be used for this purpose. In some scenarios, MAC procedures could be used for all signaling related to the maximum transport block size: For example, the initial indication of the maximum transport block size from the terminal device 200/200' to the BS 100, as well as any subsequent updates thereof, and optionally also acknowledgements from the BS 100, could be indicated in a corresponding MAC Control Element.

In some scenarios, the determination of the value of the feedback time and/or of the transport block size or maximum transport block size may in addition or alternatively be based on radio channel conditions. In this way, an improved balance between the transport block size being as large as possible and the value of the feedback time being as small as possible can be achieved. Specifically, it may be possible to provide less correlated channel conditions between successive transport blocks by selecting a smaller transport block size. The smaller transport blocks may thus benefit from diversity gains, e.g., in terms of time diversity and/or of frequency diversity.

The radio channel conditions may be estimated by the BS 100 or directly measured by the terminal device 200/200'. The estimations by the BS 100 may be based on Channel Quality Indicator (CQI) feedback from the terminal device 200/200' or various kinds of mobility indications which have implications for the time variation of the channel, including, e.g., Doppler shift measurements, UE category indications, such as "stationary", "low mobility" or "high mobility", or history information passed between base stations during handover. An example is the UE History Information IE included in the the X2AP HANDOVER REQUEST message sent from the source to the target eNB at handovers in E-UTRAN and which includes a list of the cells which the UE has traversed during the current session in RRC_CONNECTED state. Each element in the list contains the Cell Global Identity (CGI) of the cell, the cell type and the time the UE spent in the cell. Further ways to estimate mobility or speed of the terminal device 200/200' include a Location Services (LCS) related UE positioning method or a satellite positioning method, optionally assisted by the mobile network, e.g., using GPS, Galileo or GLONASS satellites, to obtain coordinates signaled from the terminal device 200/200' if it is equipped with a corresponding receiver.

Figure 5:
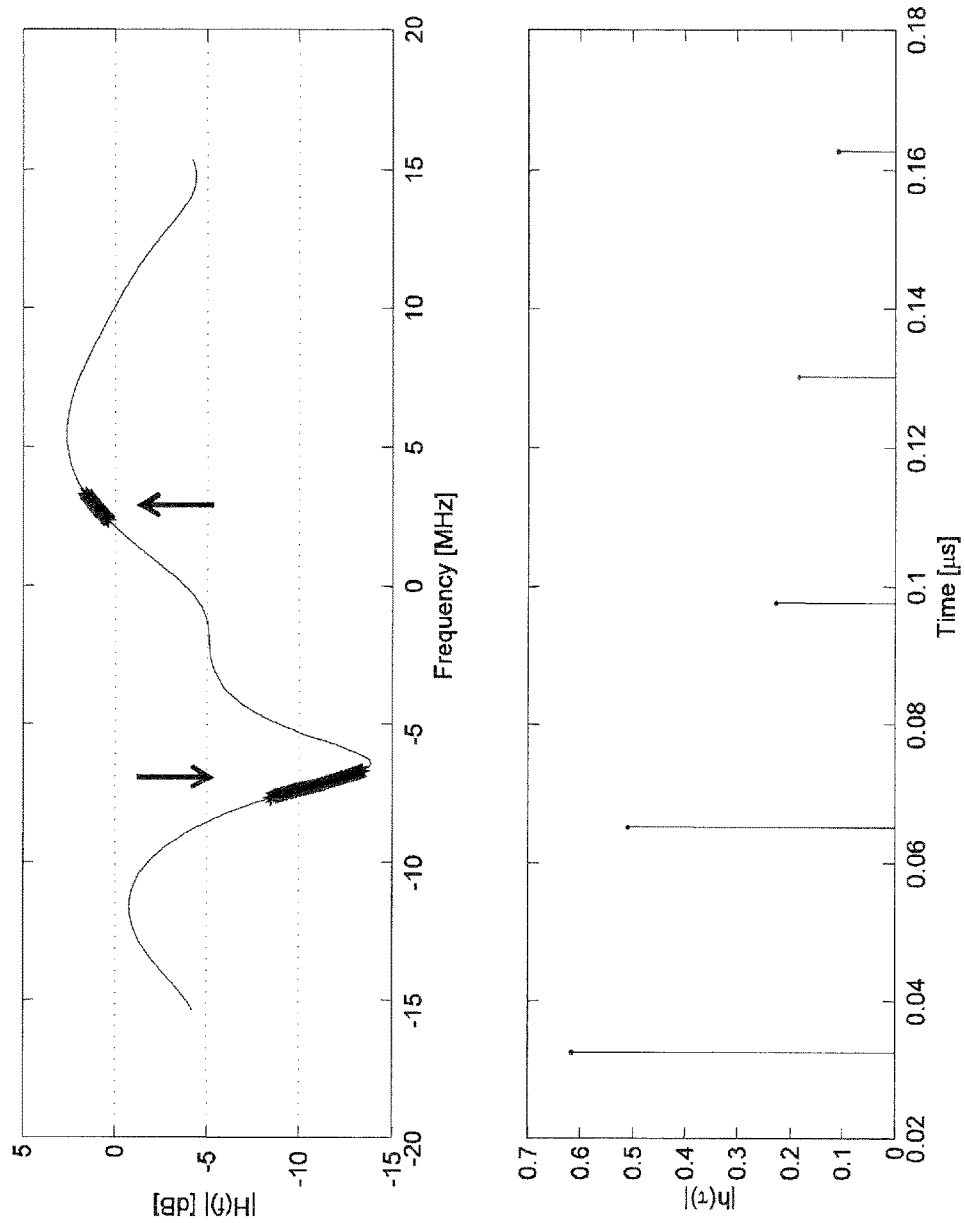
FIGS. 5 to 7 show diagrams reflecting exemplary scenarios for illustrating the effect of radio channel conditions in concepts according to an embodiment of the invention.

In order to illustrate the effect of radio channel conditions, the delay spread of the radio channel may be considered. When assuming that the bandwidth of the received signal is relatively small, e.g., on the order of 1 MHz, the channel will for small delay spreads, e.g., a delay spread of 25 ns rms, be relatively frequency flat. This in turn means that the entire 1 MHz channel might be in a fading dip. If this is the case it may be advantageous to utilize frequency diversity by sending different transport blocks on different frequencies, e.g., with a separation of about 10 MHz apart. FIG. 5 depicts an exemplary amplitude function (upper diagram) and magnitudes of impulse response (lower diagram) for such a radio channel. The scenario of FIG. 5 may for example represent a typical indoor communication scenario where both the transmitter and the receiver are located about 30 m apart. In FIG. 5 two channels, separated by about 10 MHz, are highlighted by vertical arrows. The power difference between the frequency channels is 11.8 dB, but even larger differences might occur in other scenarios. In the scenario of FIG. 5, without knowledge of the individual frequency channels, sending two small transport blocks on the different frequency channels should therefore be preferred over sending one large transport block on one of the channels in order to benefit from frequency diversity gain.

Figure 6:
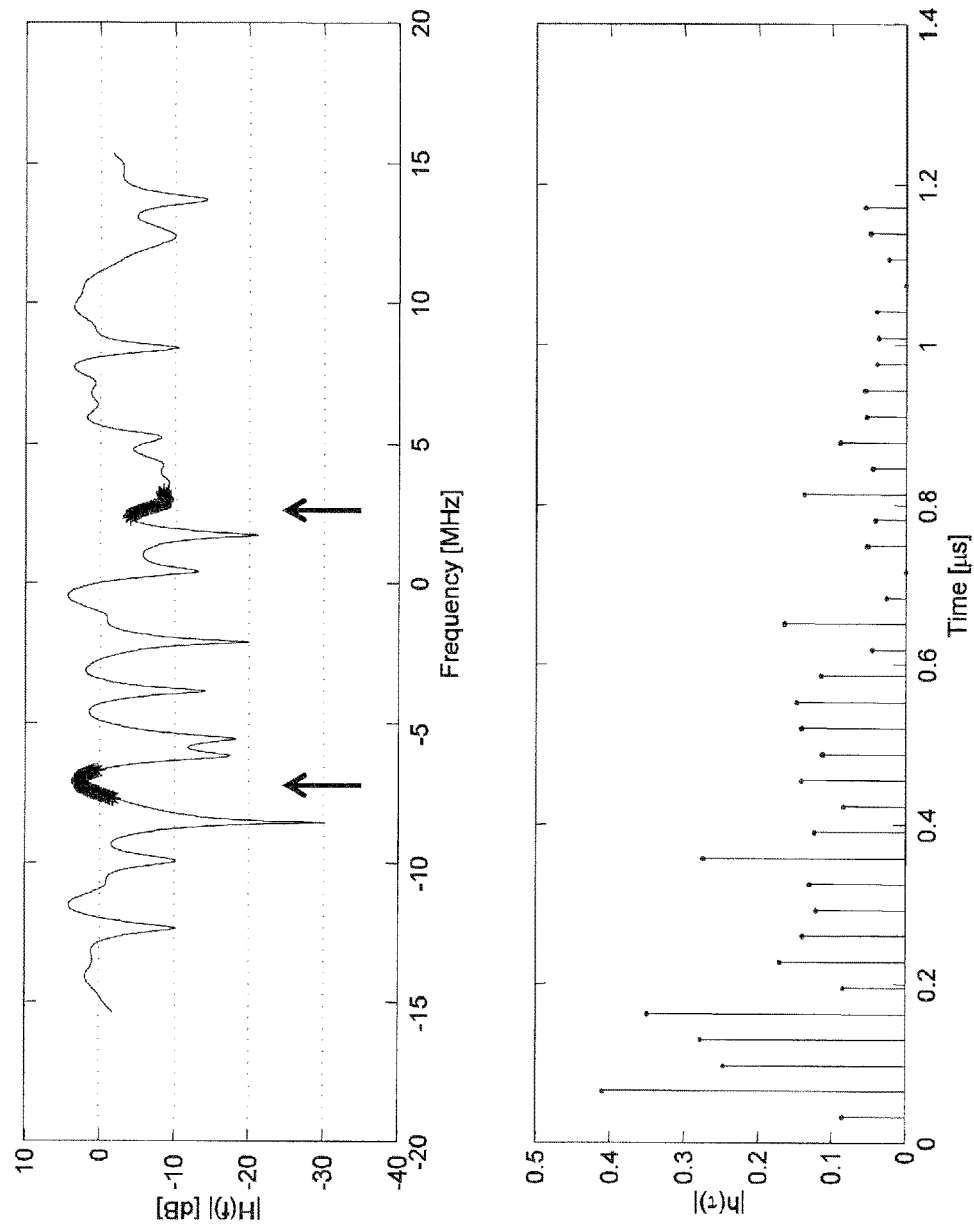

For other locations of transmitter and receiver, the delay spread might be considerably larger. In FIG. 6, an exemplary scenario is illustrated when instead assuming a delay spread of 250 ns rms. As can be seen, the variations between the two 1 MHz wide channels can be expected to be smaller than for the scenario of FIG. 5, but still significant variations may occur, which means that it is beneficial to use different frequency channels. For the two highlighted 1 MHz wide channels the power difference is about 8 dB.

Figure 7:
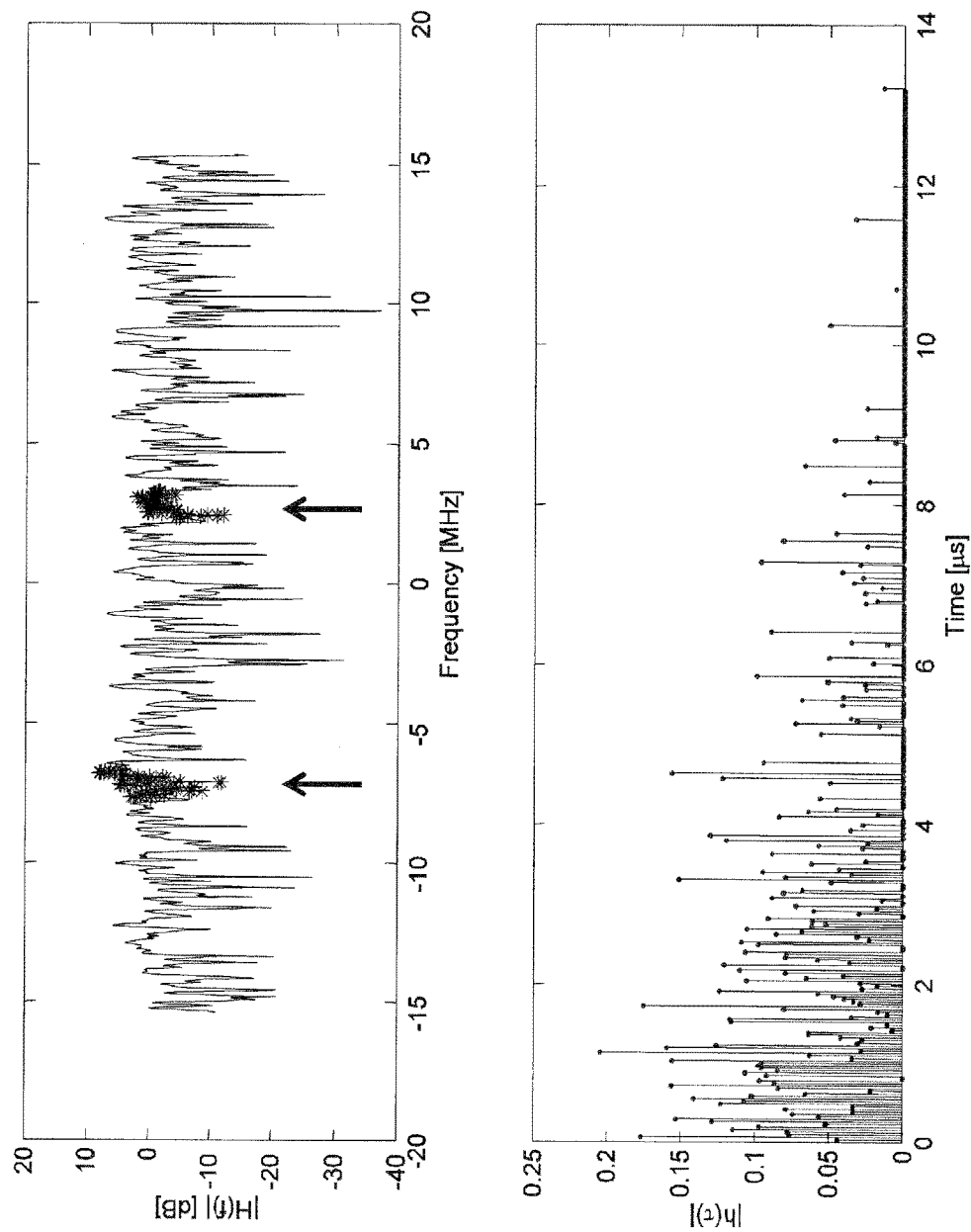

If the delay spread is increased even further, the expected power variations between different 1 MHz wide frequency channels will decrease so that there is little gain from using different frequency channels. FIG. 7 illustrates an exemplary scenario when instead assuming a delay spread of 2 μs rms. As can be seen, in this scenario the average power for a 1 MHz wide frequency channel will typically only vary marginally, which is due to a high frequency selectivity of the channel. For the highlighted 1 MHz channels, the power difference is about 3.5 dB.

In a further example, the time variation of the radio channel, e.g., as measured by the Doppler spread, may be considered. In an illustrative scenario, it can be assumed that the duration of a transport block is up to 1 ms whereas the time between two consecutive transport blocks is 8 ms or more. In case of a static channel, where the channel conditions remain the same it is then beneficial to use a large transport block size to allow for a larger coding gain. However, if the channel is varying such that the correlation time of the channel is less than the time between two consecutive transport blocks, smaller transport blocks may be preferred in order to benefit from time diversity.

In a further example of considering the radio channel conditions, the transport block size is, if possible, chosen large enough to ensure that time diversity is obtained within the same transport block. For example, if the correlation time of the channel is about 0.5 ms, it may be beneficial to avoid transport blocks of smaller duration than the correlation time.

The above examples of considering the radio channel conditions may be combined with each other. Further, it is to be understood that in each case the transport block size may depend directly on the basis of the value of the feedback time, e.g., as in the procedures of FIG. 3, that the transport block size may be controlled by defining a maximum transport block size, e.g., as in the procedures of FIG. 4.

Figure 8:
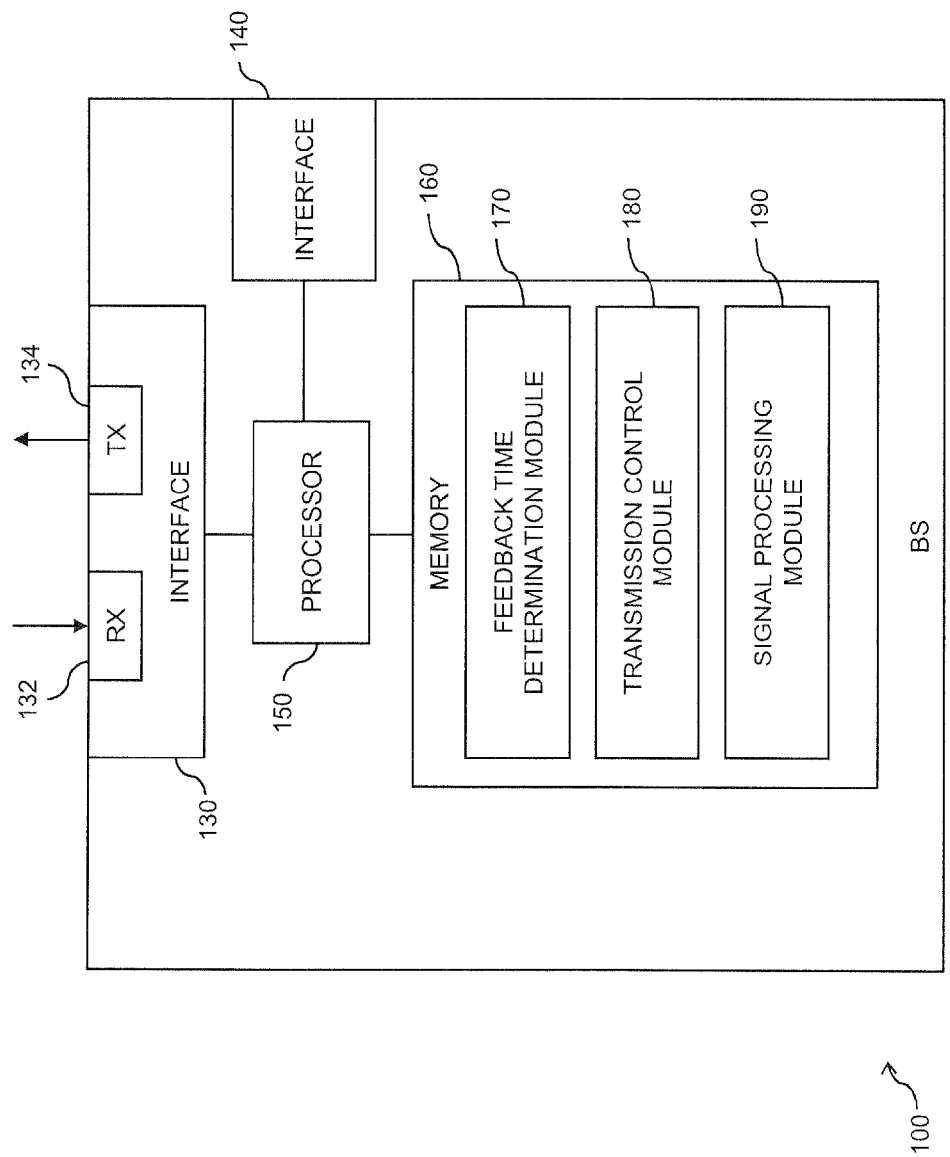
FIG. 8 schematically illustrates a base station according to an embodiment of the invention.

FIG. 8 schematically illustrates exemplary structures for implementing the above-described concepts in the BS 100.

In the illustrated structure, the BS 100 includes a radio interface 130 for transmitting transmissions to one or more terminal devices, e.g., the terminal devices 200, 200', and/or for receiving transmissions from these terminal devices. It is to be understood that for implementing transmitter (TX) functionalities the radio interface 130 will include one or more transmitter elements 134, and that for implementing receiver (RX) functionalities the radio interface 130 will include one or more receiver elements 132. In the above-mentioned LTE scenario, the radio interface 130 may correspond to the Uu interface. Further, the BS 100 may include a control interface 140 for communicating with other nodes of the mobile network, e.g., the control node 300 of FIG. 2.

Further, the BS 100 includes a processor 150 coupled to the interfaces 130, 140 and a memory 160 coupled to the processor 150. The memory 160 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 160 includes suitably configured program code to be executed by the processor 150 so as to implement the above-described functionalities of the BS 100. More specifically, the memory 160 may include a feedback time determination module 170 for accomplishing the above-described determination of the value of the variable feedback time. Further, the memory 160 may include a transmission control module 180 for controlling the procedures for transmission of data blocks in the above-mentioned manner. As mentioned above, this control may be accomplished on the basis of the value of the variable feedback time. Further, the memory 160 may also include a signal processing module 190, e.g., for performing decoding of incoming transmissions or encoding of outgoing transmissions. However, it is to be understood that signal processing may at least in part also be accomplished by dedicated hardware, e.g., in the form of one or more signal processor.

It is to be understood that the structure as illustrated in FIG. 8 is merely schematic and that the BS 100 may actually include further components which, for the sake of clarity, have not been illustrated, e.g., further interfaces or additional processors. Also, it is to be understood that the memory 160 may include further types of program code modules, which have not been illustrated. For example, the memory 160 may include program code modules for implementing typical functionalities of a BS. According to some embodiments, also a computer program product may be provided for implementing concepts according to embodiments of the invention, e.g., a computer-readable medium storing the program code and/or other data to be stored in the memory 160.

Figure 9:
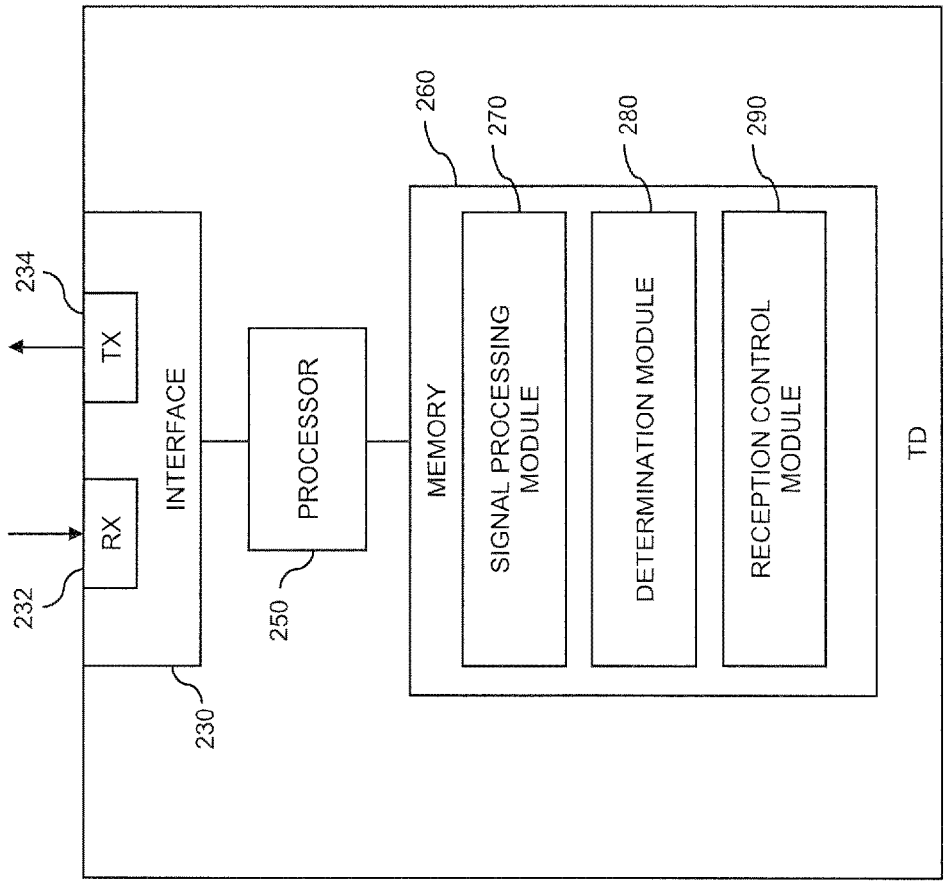
FIG. 9 schematically illustrates a terminal device according to an embodiment of the invention.

FIG. 9 schematically illustrates exemplary structures for implementing the above-described concepts in the terminal device 200/200'.

In the illustrated structure, the terminal device 200/200' includes a radio interface 230 for performing transmissions to or from a BS of a mobile network, e.g., the BS 100. It is to be understood that for implementing transmitter (TX) functionalities the radio interface 230 will include one or more transmitter elements 234, and that for implementing receiver (RX) functionalities the radio interface 230 will include one or more receiver elements 232. In the above-mentioned LTE scenario, the radio interface 230 may correspond to the Uu interface.

Further, the terminal device 200/200' includes a processor 250 coupled to the radio interface 230 and a memory 260 coupled to the processor 250. The memory 260 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 260 includes suitably configured program code to be executed by the processor 250 so as to implement the above-described functionalities of the terminal device 200/200'. More specifically, the memory 260 may also include a signal processing module 270, e.g., for performing decoding of incoming transmissions or encoding of outgoing transmissions. However, it is to be understood that signal processing may at least in part also be accomplished by dedicated hardware, e.g., in the form of one or more signal processor. Further, the memory 260 may include a determination module 280 for accomplishing the above-described determination of the value of the variable feedback time and/or of the maximum data block size. Further, the memory 260 may include a reception control module 290 for controlling the procedures for reception of data blocks in the above-mentioned manner. As mentioned above, this control may be accomplished on the basis of the value of the variable feedback time.

It is to be understood that the structure as illustrated in FIG. 9 is merely schematic and that the terminal device 200/200' may actually include further components which, for the sake of clarity, have not been illustrated, e.g., further interfaces or additional processors. Also, it is to be understood that the memory 260 may include further types of program code modules, which have not been illustrated. For example, the memory 260 may include program code modules for implementing typical functionalities of a terminal device or program code of one or more applications to be executed by the processor 250. According to some embodiments, also a computer program product may be provided for implementing concepts according to embodiments of the invention, e.g., a computer-readable medium storing the program code and/or other data to be stored in the memory 260.

Figure 10:
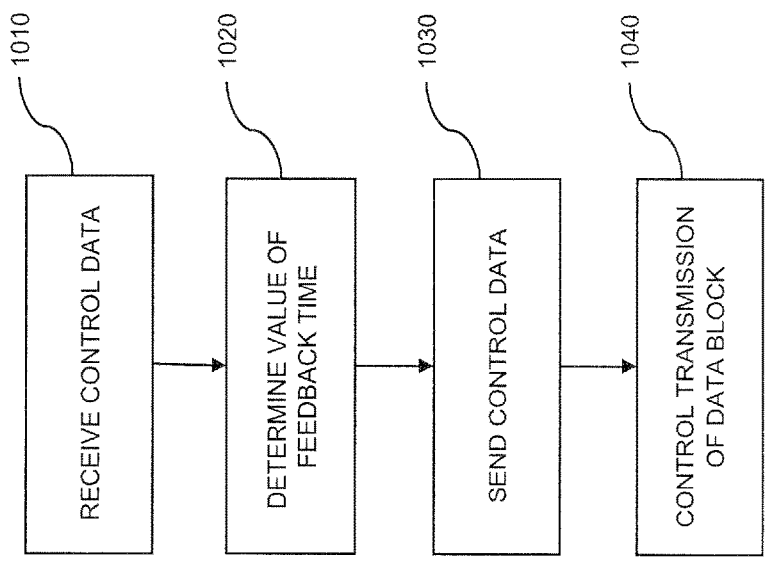
FIG. 10 shows a flowchart for illustrating a method according to an embodiment of the invention.

FIG. 10 shows a flowchart for illustrating a method which may be used for implementing the above-mentioned concepts in a transmitter, e.g., in the transmitter 10 or in the BS 100. Accordingly, the method may be used for controlling wireless transmission of data blocks between the transmitter and a receiver, e.g., the receiver 14 or one of the terminal devices 200, 200'. The transmission of the data blocks is implemented on the basis of a retransmission protocol with variable value of a feedback time. For example, the retransmission protocol may be an ARQ protocol or HARQ protocol implemented on the physical layer. The feedback time defines a time interval between transmission of one of the data blocks and transmission of a feedback message indicating whether the data block was successfully received.

At step 1010, the transmitter may receive control data. The transmitter may receive the control data from the receiver. In addition or as an alternative, the transmitter may receive the control data from a control node. If the transmitter is a base station of a mobile network, such as the BS 100, the control node may be another node of the mobile network, e.g., the control node 300 or the database 320.

At step 1020, the transmitter determines a value of the feedback time. This may be accomplished on the basis of a size of the data block, individually for this data block or for a group of data blocks. For example, the transmitter may determine the value of the feedback time on the basis of the control data received at step 1010. In addition or as an alternative, the transmitter may determine the value of the feedback time on the basis of data indicating a device category of the receiver. An example of such a device category may be a "low-performance UE" or "MTC terminal device".

In some scenarios, the transmitter may also receive data related to the receiver from a database, e.g., from the database 320. Such data could be received with the control data of step 1010. On the basis of the data received from the database, the transmitter may then determine the value of the feedback time. For example, the data received from the database could explicitly indicate the value of the feedback time or a mapping of multiple values of the feedback time to corresponding sizes of the data block.

At step 1030, the transmitter may send control data to the receiver. The control data may indicate the determined value of the feedback time to the receiver. Upon receiving the control data, the receiver may adjust its operation in accordance with the indicated value of the feedback time. For example, the receiver may control reception of the data block on the basis of the basis of the indicated feedback time. This reception may for example include decoding an initial transmission of the data block, sending the feedback message, and/or receiving a retransmission of the data block after expiry of a time interval corresponding to the value of the feedback time and starting at the initial transmission of the data block. The receiver may also scale an operating voltage on the basis of the value of the feedback time and/or adjust a clock frequency on the basis of the value of the feedback time.

At step 1040, the transmitter controls the transmission of the data block. This may involve that the transmitter controls the size of the data block on the basis of the determined value of feedback time. Further, this may involve that the transmitter performs an initial transmission of the data block, receives the feedback message indicating whether the data block was successfully received after expiry of a time interval corresponding to the value of the feedback time and starting at the initial transmission of the data block, and/or performs a retransmission of the data block in case the feedback message indicated unsuccessful reception of the initial transmission, e.g., a NACK. The transmitter may also perform a retransmission of the data block if the feedback message is absent. In addition, the transmitter may control the size of the data block on the basis of radio channel conditions. For example, the radio channel conditions could represent a correlation time and/or a frequency selectivity of a radio channel between the transmitter and the receiver. The control on the basis of the radio channel conditions may be used to achieve a diversity gain. The diversity gain may be a frequency diversity gain and/or a time diversity gain, e.g., as explained in connection with FIGS. 5 to 7.

Controlling the transmission at step 1040 may also involve that transmitter controls the retransmission of the data block on the basis of the determined value of the feedback time. For example, the transmitter may control the retransmission to not occur before a time interval corresponding to the determined value of the feedback time and starting when the initial transmission of the data block has ended.

Figure 11:
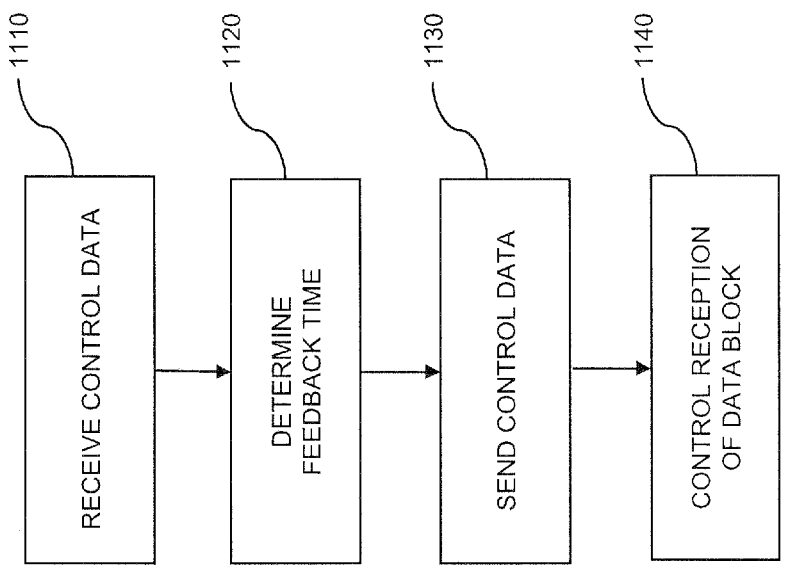
FIG. 11 shows a flowchart for illustrating a further method according to an embodiment of the invention.

FIG. 11 shows a flowchart for illustrating a method which may be used for implementing the above-mentioned concepts in a receiver, e.g., in the receiver 14 or in the terminal device 200 or 200'. Accordingly, the method may be used for controlling wireless transmission of data blocks between a transmitter, e.g., the transmitter 10 or the BS 100, and the receiver. The transmission of the data blocks is implemented on the basis of a retransmission protocol with variable value of a feedback time. For example, the retransmission protocol may be a ARQ protocol or HARQ protocol implemented on the physical layer. The feedback time defines a time interval between transmission of one of the data blocks and transmission of a feedback message indicating whether the data block was successfully received.

At step 1110, the receiver may receive control data. The receiver may receive the control data from the transmitter.

At step 1120, the receiver determines a value of the feedback time. For example, the transmitter may determine the value of the feedback time on the basis of the control data received at step 1110. For example, the control data could explicitly indicate the value of the feedback time or could indicate a minimum limit and/or a maximum limit for the value of the feedback time. The control data could also indicate a group of allowed values of the feedback time.

In some scenarios, the receiver may determine the value of the feedback time on the basis of operating conditions of the receiver, e.g., an amount of processing resources which are available at the receiver for processing of signals for transmission of the data block. This may in turn depend on, e.g., whether the receiver is in a low power mode or one or more applications running at the receiver.

On the basis of the determined value of the feedback time, the receiver may also determine a maximum data block size. The maximum data block size may be selected to comply with the value of the feedback time so that the receiver is capable of generating the feedback message within the feedback time. In addition, the transmitter may determine the maximum data block size on the basis of radio channel conditions. For example, the radio channel conditions could represent a correlation time and/or a frequency selectivity of a radio channel between the transmitter and the receiver. The control on the basis of the radio channel conditions may be used to achieve a diversity gain. The diversity gain may be a frequency diversity gain and/or a time diversity gain, e.g., as explained in connection with FIGS. 5 to 7.

At step 1130, the receiver may send control data to the transmitter. The control data may indicate the determined value of the feedback time and/or the determined value of the maximum data block size. Upon receiving the control data, the transmitter may adjust its operation in accordance with the indicated value of the feedback time or the indicated maximum data block size. For example, the transmitter may control transmission of the data block on the basis of the indicated feedback time and/or the indicated maximum data block size. This may involve that the transmitter controls the size of the data block on the basis of the determined value of feedback time or on the basis of the indicated maximum data block size, depending on which of the feedback time and/or the maximum data block size that the receiver sent to the transmitter. Further, this may involve that the transmitter performs an initial transmission of the data block, receives the feedback message indicating whether the data block was successfully received after expiry of a time interval corresponding to the value of the feedback time and starting at the initial transmission of the data block, and/or performs a retransmission of the data block. The transmitter may also control the retransmission of the data block on the basis of the determined value of the feedback time. For example, the transmitter may control the retransmission to not occur before a time interval corresponding to the determined value of the feedback time and starting when the initial transmission of the data block has ended.

At step 1140, the receiver controls the reception of the data block, which may be accomplished on the basis of the value of the feedback time. This reception may for example include decoding an initial transmission of the data block, sending the feedback message, and/or receiving a retransmission of the data block after expiry of a time interval corresponding to the value of the feedback time and starting at the initial transmission of the data block. In some scenarios, the receiver may enter or leave a low power mode on the basis of the value of the feedback time. For this purpose, the receiver may scale an operating voltage on the basis of the value of the feedback time and/or adjust a clock frequency on the basis of the value of the feedback time.

The methods of FIGS. 10 and 11 can be combined with each other, e.g., in a system in which the transmitter operates in accordance with the method of FIG. 10 and one or more receivers operate in accordance with the method of FIG. 11.

As can be seen, the concepts as explained above may be used to relax timing constraints associated with the feedback of the retransmission protocol. In this way, receivers having different performance levels can be efficiently supported. This is especially beneficial when considering low-performance terminal devices, such as MTC terminal devices. Also a low-power mode of the receiver can be supported in an efficient manner. Further, associating the values of the feedback delay with the data block size may enable efficient utilization of the device hardware for different data block sizes.

It is to be understood that the examples and embodiments as explained above are merely illustrative and susceptible to various modifications. For example, the concepts could be used in types of mobile network which differ from the above-mentioned example of an LTE mobile network. Also, the concepts may be used not only to support low-performance terminal devices by using larger values of the feedback time, but to support high-performance terminal devices by using smaller values of the feedback time, for example even smaller than the currently specified value in existing cellular systems such as LTE, e.g., if a low latency is desired. Further, it is to be understood that the above concepts may be implemented by using correspondingly designed software in existing mobile network nodes or terminal devices, or by using dedicated hardware of such mobile network nodes or terminal devices.

The invention claimed is:

1. A method of controlling wireless transmission of data blocks between a transmitter and a receiver based on a retransmission protocol with a variable value of a feedback time, the method comprising:
   determining, by the transmitter, the value of the feedback time, wherein the feedback time defines a time interval between transmission of a data block by the transmitter and transmission of a feedback message by the receiver indicating whether the data block was successfully received by the receiver; and
   controlling, by the transmitter, transmission of the data block to the receiver based on the determined value of the feedback time.

2. The method of claim 1, further comprising controlling, by the transmitter, the size of the data block based on the determined value of feedback time.

3. The method of claim 2, further comprising controlling, by the transmitter, the size of the data block based on radio channel conditions.

4. The method of claim 1, further comprising controlling, by the transmitter, retransmission of the data block based on the determined value of the feedback time.

5. The method of claim 1, further comprising:
   receiving, by the transmitter, control data; and
   determining, by the transmitter, the value of the feedback time based on the received control data.

6. The method of claim 5, wherein said receiving the control data is from the receiver.

7. The method of claim 5, wherein receiving the control data is from a control node.

8. The method of claim 7, wherein the control node is a Mobility Management Entity (MME).

9. The method of claim 1, further comprising determining, by the transmitter, the value of the feedback time based on data indicating a device category of the receiver.

10. The method of claim 9, wherein the transmitter is a base station, the receiver is a terminal device, and the device category includes a Machine Type Communication (MTC) terminal device.

11. The method of claim 1, further comprising:
   receiving, by the transmitter, data related to the receiver from a database; and
   determining, by the transmitter, the value of the feedback time based on the data received from the database.

12. The method of claim 1, further comprising sending, by the transmitter, control data indicating the determined value of the feedback time to the receiver.

13. The method of claim 1, wherein:
   the transmitter is a base station of a mobile network;
   the receiver is a terminal device.

14. The method of claim 1, wherein the feedback time includes processing time by the receiver for determining that the transmitted packet was not successfully received.

15. A method of controlling wireless transmission of data blocks between a transmitter and a receiver based on a retransmission protocol with variable value of a feedback time, the method comprising:
   determining, by the receiver, the value of the feedback time, wherein the feedback time defines a time interval between transmission of a data block by the transmitter and transmission of a feedback message by the receiver indicating whether the data block was successfully received by the receiver; and
   controlling, by the receiver, reception of the data block at the receiver based on the determined value of the feedback time.

16. The method of claim 15, further comprising:
   receiving, by the receiver, control data from the transmitter; and
   determining, by the receiver, the value of the feedback time based on the received control data.

17. The method of claim 15, further comprising sending, by the receiver, control data indicating the determined value of the feedback time to the transmitter.

18. The method of claim 15, further comprising:
   determining, by the receiver, a maximum data block size based on the determined value of the feedback time; and
   sending, by the receiver, control data indicating the determined maximum data block size to the transmitter.

19. The method of claim 18, wherein determining the maximum data block size is based on radio channel conditions.

20. The method of claim 15, further comprising entering or leaving, by the receiver, a low power mode based on the determined value of the feedback time.

21. The method of claim 15, further comprising scaling, by the receiver, an operating voltage or adjusting, by the receiver, a clock frequency based on the determined value of the feedback time.

22. The method of claim 15, further comprising determining the value of the feedback time based on an amount of processing resources which are available at the receiver for processing of signals for transmission of the data block.

23. The method of claim 15, wherein:
   the transmitter is a base station of a mobile network; and
   the receiver is a terminal device.

24. A transmitter, comprising:
   a radio interface configured to wirelessly transmit data blocks to a receiver; and
   a processing circuit configured to:
      control transmission of the data blocks based on a retransmission protocol with variable value of a feedback time, the feedback time defining a time interval between transmission of a data block by the transmitter and transmission of a feedback message indicating whether the data block was successfully received by the receiver;
      determine the value of the feedback time; and
      control transmission of the data block to the receiver, via the radio interface, based on the determined value of the feedback time.

25. A receiver, comprising:
   a radio interface configured to wirelessly receive data blocks from a transmitter; and
   a processing circuit, wherein the processing circuit is configured to:

control reception of the data blocks based on a retransmission protocol with variable value of a feedback time, the feedback time defining a time interval between transmission of a data block by the transmitter and transmission of a feedback message indicating whether the data block was successfully received by the receiver;

determine the value of the feedback time; and control reception of the data block at the receiver, via the radio interface, based on the determined value of the feedback time.

26. A computer program product stored in a non-transitory computer readable medium for controlling wireless transmission of data blocks between a transmitter and a receiver based on a retransmission protocol with a variable value of a feedback time, the computer program product comprising software instructions which, when run on a processing circuit of the transmitter, causes the transmitter to:

determine the value of the feedback time, wherein the feedback time defines a time interval between transmission of a data block by the transmitter and transmission of a feedback message by the receiver indicating whether the data block was successfully received by the receiver; and control transmission of the data block to the receiver based on the determined value of the feedback time.

27. A computer program product stored in a non-transitory computer readable medium for controlling wireless transmission of data blocks between a transmitter and a receiver based on a retransmission protocol with a variable value of a feedback time, the computer program product comprising software instructions which, when run on a processing circuit of the receiver, causes the receiver to:

determine the value of the feedback time, wherein the feedback time defines a time interval between transmission of a data block by the transmitter and transmission of a feedback message by the receiver indicating whether the data block was successfully received by the receiver; and control reception of the data block at the receiver based on the determined value of the feedback time.

* * * * *